United States Patent [19]
Kluttz

[11] Patent Number: 5,718,752
[45] Date of Patent: Feb. 17, 1998

[54] ASPHALT COMPOSITION WITH IMPROVED PROCESSABILITY

[75] Inventor: Robert Quillin Kluttz, Houston, Tex.

[73] Assignee: Shell Oil Company, Houston, Tex.

[21] Appl. No.: 728,456

[22] Filed: Oct. 10, 1996

Related U.S. Application Data

[60] Provisional application No. 60/006,079 Oct. 24, 1995.

[51] Int. Cl.$^6$ .......................... C09D 195/00; C08L 95/00
[52] U.S. Cl. .......................... 106/273.1; 52/319.4; 52/408; 524/64; 524/68
[58] Field of Search .................. 106/273.1; 52/319.4, 52/408; 524/64, 68

[56] References Cited

U.S. PATENT DOCUMENTS

| | | | |
|---|---|---|---|
| 4,530,966 | 7/1985 | Shiraki et al. | 525/89 |
| 4,530,967 | 7/1985 | Shiraki et al. | 525/89 |
| 4,755,545 | 7/1988 | Lalwani | 524/64 |
| 4,874,821 | 10/1989 | Agostinis et al. | 525/271 |
| 5,164,455 | 11/1992 | Agostinis et al. | 525/314 |
| 5,189,110 | 2/1993 | Ikematu et al. | 525/314 |
| 5,393,841 | 2/1995 | Himes et al. | 525/314 |
| 5,486,574 | 1/1996 | Himes et al. | 525/314 |

FOREIGN PATENT DOCUMENTS

| | | | |
|---|---|---|---|
| 3148234 | 6/1983 | Germany | C08G 18/18 |
| 57-085855 | 5/1982 | Japan | C08L 95/00 |
| 2198137 | 11/1987 | United Kingdom | C08F 297/04 |

*Primary Examiner*—David Brunsman
*Attorney, Agent, or Firm*—Donald F. Haas

[57] ABSTRACT

A bituminous composition comprising a bituminous component and a radial block copolymer of styrene and butadiene which has the generalized formula:

$$(B_1-S-B_2)_n-Y$$

wherein $B_1$ is a block of polybutadiene having a weight average molecular weight of from 2000 to 8000, S is a block of polystyrene having a weight average molecular weight of 10,000 to 30,000, $B_2$ is a block of polybutadiene having a weight average molecular weight of from 40,000 to 100,000, Y is a multifunctional coupling agent, and n is an integer from 3 to 6.

12 Claims, No Drawings

ASPHALT COMPOSITION WITH IMPROVED PROCESSABILITY

CROSSREFERENCE TO RELATED APPLICATION

This application claims the benefit of U.S. Provisional application Ser. No. 60/006,079, filed Oct. 24, 1995.

BACKGROUND OF THE INVENTION

The present invention relates to asphalt compositions containing polymers for modification of the properties of the asphalt. More particularly, this invention relates to such compositions containing new polymers which are highly compatible with asphalt, are more rapidly mixable with asphalt, and give lower processing viscosities.

Asphalt is a common material utilized for the preparation of paving and roofing materials and also for coatings such as pipe coatings and tank liners. While the material is suitable in many respects, it inherently is deficient in some physical properties which it would be highly desirable to improve. Efforts have been made in this direction by addition of certain conjugated diene rubbers, ethylene containing plastics like EVA and polyethylene, neoprene, resins, fillers and other materials for the modification of one or more of the physical properties of the asphalt. Each of these added materials modifies the asphalt in one respect or another but certain deficiencies can be noted in all modifiers proposed. For example, some of them have excellent weather resistance, sealing and bonding properties but are often deficient with respect to warm tack, modulus, hardness and other physical properties; and some of them improve only the high temperature performance of asphalt, some only improve the low temperature performance of asphalt, while some lack thermal stability or mixing stability with asphalt.

Since the late 1960s, diene polymer rubbers such as styrene-butadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

To be suitable for paving materials, the asphalt polymer mixtures should meet the following requirements:

(a) The polymer must be mixable in asphalt and stay mixed during subsequent processing—compatibility. In a modified asphalt composition, compatibility is important. The polar asphaltene fraction of the asphalt is generally incompatible with the polymer and phase separates over time. This phase separation leads to a serious deterioration in physical properties.

(b) The mixture must have the right rheological (flow) properties to prevent rutting which is the permanent deformation of a road caused by repetitive traffic loads. Viscosity is important but elasticity is the most important aspect since the material must be able to recover rather than just resist deformation. This characteristic is most important in warm climates.

(c) The mixture must have good low temperature properties, i.e. resistance to cracking. As a road cools, stresses develop because it cannot shrink uniformly and eventually this will cause cracking. Traffic-caused stresses also contribute. The polymer will lower the temperature at which cracking will occur. This characteristic is more important in cold climates.

(d) Temperature susceptibility of a polymer modified asphalt is a major consideration. Ideally, one would want a binder (asphalt and polymer) which would be "hard" and elastic at elevated temperatures to resist permanent deformation.

To be suitable for synthetic roofing materials, the asphalt polymer mixtures should meet the following requirements:

(a) sufficient resistance to flow at high temperatures,
(b) sufficient flexibility at low temperatures,
(c) workability according to the conventional methods used in the roofing technique,
(d) adequate hot storage stability,
(e) adequate hardness to prevent deformation during walking on the roof, and
(f) if it is to be used as an adhesive, sufficient adhesion.

U.K. Patent Application GB 2,198,137 describes radial and branched block copolymers wherein the arms of these polymers are comprised of at least one diblock structure A–B wherein A is a polystyrene block and B is a polybutadiene block. These polymers are said to be useful additives to bitumen compounds to improve mechanical and technological properties. The butadiene blocks of these polymers are relatively large, i.e., they have a molecular weight from 20,000 to 70,000. This leads to low softening points and tensile properties.

U.S. Pat. No. 4,874,821 discloses a linear four-block polymer B1-A1-B2-A2 wherein A1 and A2 are polystyrene blocks and B1 and B2 are polybutadiene blocks and B1 is a relatively small block compared to the B2 block. These polymers are said to be endowed with a desired balance of mechanical characteristics, rheologic characteristics, and characteristics of thermooxidative resistance. Such linear polymers when used in bituminous compositions, suffer from the disadvantage that they are not as efficient as radial polymers and, being sequentially synthesized, require four polymerization steps and are thus less economical to produce.

One of the greatest needs in the asphalt modification market is a polymer which will mix into asphalt more rapidly than currently available polymers and which will give lower processing viscosities. In many cases, these materials are mixed and/or processed in the field and faster mixing and lower viscosity would provide the advantages of lower payroll costs and energy usage. The present invention provides a bituminous composition with those advantages.

SUMMARY OF THE INVENTION

This invention relates to a bituminous composition with improved properties over neat asphalt. The invention is a polymer modified bituminous composition which exhibits better processability and compatibility than previous polymer modified bituminous compositions. These compositions are able to be mixed more easily than prior art compositions. The bituminous composition comprises a bituminous component and a radial block copolymer of a vinyl aromatic hydrocarbon, preferably styrene, and a conjugated diene, preferably butadiene, which has the generalized formula:

$$(B_1-S-B_2)_n-Y$$

wherein $B_1$ is a block of a polydiene, preferably polybutadiene, having a weight average molecular weight of from 2000 to 8000, S is a block of a polyvinyl aromatic hydrocarbon, preferably polystyrene, having a weight average molecular weight of 10,000 to 30,000, and $B_2$ is a block of polydiene having a weight average molecular weight of from 40,000 to 100,000. Y is a multifunctional coupling agent such as silicon tetrachloride or dimethyl adipate, or y-glycidoxypropyltrimethoxysilane. n is an integer from 3 to 6. Specific applications of this composition include roofing materials, coatings, hot melt asphalt concrete, and sealant compositions.

DETAILED DESCRIPTION OF THE INVENTION

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials. Any asphalt may be used, even asphalts with high asphaltene contents, i.e. greater than 12%. Such asphalts are generally incompatible with the polymer component. Asphalteries are known to those skilled in the art. For purposes of this application, asphaltenes make up the n-heptane insoluble fraction of asphalt.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

Polymers containing ethylenic unsaturation or both aromatic, such as from styrene, and ethylenic unsaturation, such as from butadiene, may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of butadiene and styrene are prepared by contacting the monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0°C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The polymers used to modify the bituminous compositions of the present invention are radial polymers which have the generalized formula:

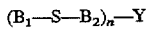

having from 3 to 6 arms (hence, n in the above formula ranges from 3 to 6). S is a block of polystyrene having a weight average molecular weight of from 10,000 to 30,000. If S is greater than 30,000 then the polymer is less compatible and more difficult to mix, thus negating the benefits of the invention.

$B_1$ is a block of polydiene, preferably polybutadiene, having a weight average molecular weight of from 2000 to 8000. It is the presence of this block $B_1$ which provides the novel and unobvious advantages of the present invention over the polymers which have been used in the past. The very low molecular weight range does not alter the desired performance properties of the polymers of the prior art but does allow the polymer to be more rapidly dissolved in the bituminous material, to be more compatible with the bituminous material than prior art polymers, and to exhibit lower processing viscosities than bituminous compositions containing the prior art polymers. The molecular weight of block $B_1$ should not be less than 2000 because little improvement is seen at lower molecular weights. The molecular weight of block $B_1$ should not be greater than 8000 because higher molecular weights detract from beneficial properties thus necessitating the use of excessive amounts of polymer. $B_2$ is a block of polydiene (polybutadiene) having a molecular weight of from 40,000 to 100,000.

These weight ranges are chosen to achieve an overall polystyrene content or PSC of from 25 percent to 35 percent. If the PSC is less than 25 percent, then excessive amounts of polymer are required to achieve desired properties. If the PSC is greater than 35 percent, then the polymer is less compatible and more difficult to mix.

Y is a multifunctional coupling agent. Such coupling agents are well known in the art to which this invention pertains. In general, the block copolymer is useful as arms and the radial block copolymers of the present invention will be in solution when contacted with the coupling agent. Suitable solvents include those useful in the solution polymerization of the polymer.

Any of the coupling agents known in the prior art to be useful in forming a radial polymer by contacting the same with a living polymer may be used in both the method of this invention and the asymmetric radial polymers of this invention. Suitable coupling agents will contain three or more functional groups which will react with the living polymer at the metal-carbon bond. While the method of the present invention will improve the relative distribution of different arms in an asymmetric radial polymer having any number of arms, the method is very effective when the coupling agent contains from three to about twenty functional groups reactive with the metal-carbon bond of the "living" polymer. Suitable coupling agents, then include $SiX_4$, $RSiX_3$, $HSiX_3$, $X_3Si—SiX_3$, $RX_2Si—(CH_2)_x—SiX_2R$, $RX_2Si(CH_2)_x—SiX_2—(CH_2)_x—SiX_2R$, $X_3Si—(CH_2)_x—SiX_3$, $R—C(SiX_3)_3$, $R—C(CH_2SiX_3)_3$, $C(CH_2SiX_3)_4$ and the like, particularly those containing from three to about six functional groups. In the foregoing formulae: each X may, independently, be fluorine, chlorine, bromine, iodine, alkoxide radicals, carboxylate radicals, hydride and the like; R is a hydrocarbyl radical having from 1 to about 10 carbon atoms, preferably from 1 to about 6 carbon atoms; and x is a whole number from 1 to about 6. Particularly useful coupling agents include the silicon tetrahalides such as silicon tetrafluoride, silicon tetrachloride, silicon tetrabromide and the like, and bis(trihalo)silanes such as bis(trihalo)silylethane and hexahalodisilane where the halogen may be fluorine, chlorine, bromine, or iodine.

The coupling process per se is described in detail in U.S. Pat. No. 4,096,203 which is herein incorporated by reference. Specific multifunctional coupling agents useful herein are described in that patent but there are other coupling agents which may also be useful herein.

These polymers should have a styrene content of 25 to 35% so that they are more compatible with asphalt and so that they will provide flow resistance at reasonable molecular weight. They should have overall weight average molecular weights greater than 150,000 so that they improve flow resistance at low use levels and less than 800,000 so that they are compatible and readily mixable with asphalt.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation. Preferred epoxidized polymers for use herein are first partially hydrogenated and then epoxidized as described in the aforementioned U.S. Pat. Nos. 5,229,464 and 5,247,026.

The composition of the present invention generally comprises 80 to 98 parts by weight of a bituminous component and from 2 to 20 parts by weight per 100 parts of the composition of the epoxidized block polymer described above. If less than 2 parts of the polymer of the invention is used, then the composition does not exhibit enhanced properties (increased softening point, decreased penetration and improved fatigue resistance). If more than 20 parts are used, the composition may be too high in viscosity depending upon the specific polymer structure and viscosity.

The compositions of the present invention may optionally include other ingredients like fillers such as ground tires or inorganic fillers like talc, calcium carbonate and carbon black. The composition may also include resins and oils and other components such as stabilizers. It may also include other polymers, for example, other polymers of conjugated diolefins.

Hot melt asphalt concrete compositions according to the present invention are especially advantageous. Hot melt asphalt concrete compositions according to the present invention will normally contain from 80 parts to 99 parts by weight of aggregate and from 1 part to 20 parts of a bituminous composition which is generally comprised of 90 to 98 parts by weight per 100 parts of the bituminous composition of a bituminous component and from 2 parts to 10 parts by weight per 100 parts of the bituminous composition of one of the polymers discussed above. If less than 2 parts of the polymer is used, then improved properties are not obtained and if more than 10 parts of the polymer is used, then the composition is too costly and high in viscosity. Asphalts with good flow resistance prior to polymer addition are preferred at very low polymer concentrations because at very low polymer concentrations the polymer does not contribute strongly to other properties such as deformation resistance, i.e. rutting resistance. In other words, at low polymer concentrations, asphalts with good rutting resistance on their own are preferred.

The bituminous concrete composition may optionally include other ingredients such as fillers, such as ground tires or inorganic fillers. The composition may also include resins and oils and stabilizers. It may also include other polymers, for example, non-functionalized polymers of conjugated diolefins.

Aggregate is basically rocks and sand. It is intended to be mixed with the bituminous composition to form the hot mix asphalt concrete. The bituminous composition is the binder which holds the aggregate together.

In using the bituminous composition of the present invention in hot melt asphalt concrete, it is preferred that these polymers comprise from 2 to 10 parts by weight per hundred parts by weight of the bituminous composition. However, if it is desired to achieve the maximum property improvement in the most cost effective manner, it is most preferred that the polymers comprise from 3 to 6 parts by weight per hundred parts by weight of the bituminous composition.

Roofing compositions according to the present invention are also especially advantageous. In roofing compositions designed for roll roofing membranes a composition of 85 to 92 parts asphalt and 8 to 15 parts polymer is preferred. As with HMAC compositions other additives such as inorganic fillers, resins, oils, and stabilizers may be added.

Similar compositions may be used for laminating adhesives and tab adhesives. For laminating or tab adhesives a composition of 90 to 96 parts asphalt and 4 to 10 parts polymer is preferred.

EXAMPLES

Polymer 1 is a commercial four-arm polymer which has arms with polystyrene blocks of 21,000 weight average molecular weight and a total molecular weight of 265,000 weight average molecular weight. Three polymers similar to Polymer 1 but with added polybutadiene tails of about 5000 weight average molecular weight were synthesized. The molecular parameters are listed in Table 1. Polymers BSB #1, #2, and #3 were coupled with dimethyl adipate, silicon tetrachloride, and gamma glycidoxypropyltrimethoxy silane, respectively.

TABLE 1

Molecular Parameters

| Product | Polymer 1 | (BSB)$_4$ #1 | (BSB)$_4$ #2 | (BSB)$_4$ #3 |
|---|---|---|---|---|
| CE | 85% | 87% | 91% | 95% |
| PSC | 31% | 29% | 29% | 32% |
| B$_1$ MW[1] | — | 5000 | 5000 | 5000 |
| S MW[1] | 21,000 | 25,000 | 25,000 | 28,000 |
| Total MW[1] | 265,000 | 268,000 | 271,000 | 277,000 |

[1]MW is weight average molecular weight as defined above.

EXAMPLES 1 and 2

Valid comparison of mixing times is difficult because of different product forms. The (BSB)$_4$ polymers were produced as coagulated crumb with high porosity. Fluffy grades such as Polymer 1 are also highly porous, but are not directly comparable to crumb. Two comparisons were made to get the most representative possible data. For the first comparison, BSB #1 and BSB #2 were mixed alongside Polymer 1. For the second comparison, the BSB #1, BSB #2, and Polymer 1 were solution cast from toluene into ⅛" films and chopped to give products of identical (or nearly so) morphology. Mixing was performed using a Silverson L4R high shear mixer at 3000 rpm. Blends were made at 12% by weight for roofing compositions and 4% by weight for paving compositions. Mixing times are listed in Table 2 and properties are listed in Table 3.

TABLE 2

Mixing Times

| Product | Polymer 1 | (BSB)$_4$ #1 | (BSB)$_4$ #2 |
|---|---|---|---|
| Product Form | fluffy | crumb | crumb |
| Mixing Time | | | |
| 4% in WRAC20[1] | 50 min. | 35 min. | 40 min. |
| 12% in roofing flux[3] | 63 min. | 53 min. | 50 min. |
| Product Form | chopped plaque | chopped plaque | chopped plaque |

TABLE 2-continued

Mixing Times

| Product | Polymer 1 | (BSB)$_4$ #1 | (BSB)$_4$ #2 |
|---|---|---|---|
| Mixing Time | | | |
| 12% in WRAC20[1] | 59 min. | — | 42 min. |
| 12% in AR1000[2] | 30 min. | — | 30 min. |
| 12% in roofing flux[3] | 44 min. | — | 32 min. |

TABLE 3

Blend Properties

| Product | Polymer 1 | (BSB)$_4$ #1 | (BSB)$_4$ #2 |
|---|---|---|---|
| 4% in WRAC20[1] | | | |
| 135° C. Viscosity | 1850 cps | 1750 cps | 2000 cps |
| Softening Point | 188° F. | 174° F. | 173° F. |
| Penetration | 48 dmm | 53 dmm | 51 dmm |
| Ductility | 11 cm | 12 cm | 11 cm |
| Aged Ductility | 4 cm | 5 cm | 5 cm |
| 12% in roofing flux[3] | | | |
| Penetration | 35 dmm. | 37 dmm | 32 dmm |
| Softening Point | 275° F. | 254° F. | 253° F. |

[1]An AC20 asphalt from Shell Oil Company's Wood River Illinois refinery.
[2]An AR1000 asphalt from Shell Oil Products Company's Martinez California refinery.
[3]A commercial asphalt from Cross Refinery.

Mixing times in less compatible asphalts (WRAC20) are reduced by up to 30%. This is a significant improvement. Other properties are comparable except for softening points which are low. The low softening points are probably due to the low styrene content, 29% for the (BSB)$_4$, polymers vs. 31% for the conventional (SB)$_4$ polymer.

EXAMPLE 3

Polymer 1 and BSB #3 were compared as chopped solution cast films. Preparation of solution cast films and mixing were accomplished as described in Examples 1 and 2. Results are shown in Table 4.

TABLE 4

| Product | Polymer 1 | (BSB)$_4$ #3 |
|---|---|---|
| 4% in WRAC20 | | |
| Softening Point | 178° F. | 165° F. |
| G*/sinδ @ 82° C. | 1.02 kPa | 1.11 kPa |
| Mix time | 35 min. | 28 min. |
| 12% in WRAC20 | | |
| Softening Point | 253° F. | 239° F. |
| 190° C. Viscosity | 1650 cps | 1980 cps |
| Mix time | 44 min. | 35 min. |

Mixing times in less compatible asphalts (WRAC20) are reduced by up to 30%. This is a significant improvement. Other properties are comparable except for softening points which are low. As Example 3 shows, increasing the styrene content improves the relative softening point. In Example 3, G*/sinδ, which corresponds better to high temperature performance, is actually slightly higher than the control.

I claim:

1. A bituminous composition comprising a bituminous component and a radial block copolymer of a vinyl aromatic hydrocarbon and a conjugated diene which has the generalized formula:

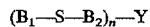

wherein $B_1$ is a block of polydiene having a weight average molecular weight of from 2000 to 8000, S is a block of polyvinyl aromatic hydrocarbon having a weight average molecular weight of 10,000 to 30,000 $B_2$ is a block of polydiene having a weight average molecular weight of from 40,000 to 100,000. Y is a multifunctional coupling agent, and n is an integer from 3 to 6.

2. The composition of claim 1 wherein the polymer comprises from 2 parts to 20 parts by weight of the bituminous composition.

3. The composition of claim 1 wherein $B_1$ and $B_2$ are polybutadiene blocks and S is a polystyrene block.

4. A roll roofing membrane comprising a membrane and the bituminous composition of claim 1.

5. The roll roofing membrane of claim 4 wherein the polymer comprises from 8 to 15 parts per 100 parts by weight of the bituminous composition.

6. The membrane of claim 5 wherein $B_1$ and $B_2$ are polybutadiene blocks and S is a polystyrene block.

7. A hot melt asphalt concrete composition comprising:
 (a) from 80 parts to 98 parts by weight of aggregate, and
 (b) from 2 parts to 20 parts by weight of the bituminous composition of claim 1.

8. The composition of claim 7 wherein $B_1$ and $B_2$ are polybutadiene blocks and S is a polystyrene block.

9. The hot melt asphalt concrete composition of claim 7 wherein the bituminous composition is comprised of:
 (a) from 90 parts to 98 parts by weight per 100 parts of the bituminous composition of the bituminous component, and
 (b) from 2 parts to 10 parts by weight per 100 parts of the bituminous composition of the polymer.

10. The composition of claim 9 wherein $B_1$ and $B_2$ are polybutadiene blocks and S is a polystyrene block.

11. The hot melt asphalt concrete composition of claim 7 wherein the polymer comprises from 3 parts to 6 parts by weight per hundred parts by weight of the bituminous composition.

12. The composition of claim 11 wherein $B_1$ and $B_2$ are polybutadiene blocks and S is a polystyrene block.

* * * * *